No. 744,413. Patented November 17, 1903.

UNITED STATES PATENT OFFICE.

WALTER T. SCHEELE, OF BALTIMORE, MARYLAND, ASSIGNOR TO WILLIAM J. HOOPER, OF BALTIMORE, MARYLAND.

PROCESS OF MANUFACTURING VARNISHES.

SPECIFICATION forming part of Letters Patent No. 744,413, dated November 17, 1903.

Application filed February 16, 1903. Serial No. 143,688. (No specimens.)

*To all whom it may concern:*

Be it known that I, WALTER T. SCHEELE, a subject of the Emperor of Germany, residing at Baltimore, in the State of Maryland, have invented certain new and useful Improvements in Processes of Manufacturing Varnishes, &c.; and I do declare the following to be a full, clear, and exact description of the invention, such as will enable others skilled in the art to which it appertains to make and use the same.

This invention relates to an improved process of treating gums or resins for the manufacture of varnishes, driers, lacquers, and stains.

One class of varnishes, driers, lacquers, and stains cannot be manufactured without the application of heat. Another class is manufactured by dissolving gums or resins in either alcohol or amylacetate at a moderate heat and with the aid of a steam-bath.

My invention has for its object to improve upon the above state of the art and to furnish a direct, absolute, and exhaustive solvent for any gum or resin. Such direct solvents I have found to be ethylmethyl, diethyl, dipropyl, ethyl, capron, butyl, propyl, ethylbutyl, methyl valeral, valeron, and methylamyl ketones, which for the purpose of this invention are equivalents. These ketones have their boiling-point between 80° and 227° Celsius, while acetone has a boiling-point of but 56° Celsius. These ketones can be used singly or intermixed in different proportions, the proportions differing, of course, with the gums or resins treated.

Example: For the solution of Manila copal I grind the copal to a coarse powder, dry the powder at about blood-heat temperature, and subject the dried substance to the action of the solvent, using about one gallon of the solvent to each three pounds of the copal powder. Either or a mixture of the above specified ketones may be used as the solvent. The solution of the gum will be complete after the solvent has been in contact therewith under agitation for about one hour at about 60° to 65° Fahrenheit. Alcohol and acetone dissolve Manila copal partly, but not without the gum being first fused and the liquid being brought into contact with the fused gum with the aid of a steam-bath. Thus I obtain an absolutely pure solution of the Manila gum-copal without the use of any chemicals except the solvent and without the aid of any heat.

What I claim is—

1. The process of manufacturing varnishes, lacquers, &c., which consists in subjecting a comminuted gum to the action of a ketone having its boiling-point between 80° and 227° Celsius, at a temperature not exceeding 60° to 65° Fahrenheit.

2. The process of manufacturing gum solutions, which consists in treating the gum with a ketone having its boiling-point between 80° and 227° Celsius.

In testimony whereof I have hereunto set my hand in presence of two subscribing witnesses.

WALTER T. SCHEELE.

Witnesses:
F. C. JACOBS,
A. B. HAMMOND.